(12) United States Patent
Hosokawa

(10) Patent No.: US 9,263,090 B2
(45) Date of Patent: Feb. 16, 2016

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Shuichi Hosokawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 14/065,607

(22) Filed: Oct. 29, 2013

(65) Prior Publication Data

US 2014/0133838 A1    May 15, 2014

(30) Foreign Application Priority Data

Nov. 9, 2012   (JP) .................................. 2012-247455

(51) Int. Cl.
H04N 5/78     (2006.01)
G11B 27/036   (2006.01)

(52) U.S. Cl.
CPC .................................. *G11B 27/036* (2013.01)

(58) Field of Classification Search
None
See application file for complete search history.

(56) References Cited

U.S. PATENT DOCUMENTS

2008/0193099 A1* 8/2008 Nakai et al. ..................... 386/52
2012/0201291 A1* 8/2012 Makino .................... 375/240.02

FOREIGN PATENT DOCUMENTS

JP    2008-252940 A    10/2008

* cited by examiner

Primary Examiner — William C Vaughn, Jr.
Assistant Examiner — Eileen Adams
(74) Attorney, Agent, or Firm — Carter, DeLuca, Farrell & Schmidt, LLP

(57) ABSTRACT

An image processing apparatus for editing moving image data of successive frames to which a time code of a same value is made to correspond every first predetermined number of frames, the moving image data being coded on a unit basis of a coding unit which includes a second predetermined number of frames, obtains information regarding the coding unit from management information of the moving image data, determines a candidate of an editing point of the moving image data based on the obtained information and the time code made to correspond to the frames of the moving image data, sets the editing point of the moving image data based on a designated editing point and the determined candidate, and edits the moving image data according to the set editing point.

21 Claims, 8 Drawing Sheets

IMAGE PROCESSING APPARATUS, IMAGE PROCESSING METHOD, AND PROGRAM

BACKGROUND OF THE INVENTION

1. Field of the Invention

The present invention relates to an image processing apparatus and, more particularly, to an image processing apparatus for editing moving image data, an image processing method, and a program.

2. Description of the Related Art

In the related art, such a technique that an editing point (In-point, Out-point) of a moving image is determined by using time code information added to moving image data and then an editing is performed is known (for example, refer to the Official Gazette of Japanese Patent Application Laid-Open No. 2008-252940). A time code indicates an hour, a minute, a second, and a frame. The number of frames in the time code is set by a broadcasting method. For example, in the case of NTSC, 0 to 29 are added as frames, and in the case of PAL, 0 to 24 are added.

In the related art, such a technique that a moving image is coded by an MPEG method or the like also is known. In MPEG, each frame of the moving image is coded by one of an intra-frame coding, a forward-prediction motion compensation inter-frame coding, and a bidirectional-prediction motion compensation inter-frame coding. In MPEG, the coding is performed on a unit basis called a GOP (Group of Picture) constructed by intra-frame coding frames (I frames), forward-prediction inter-frame coding frames (P frames), and bidirectional-prediction inter-frame coding frames (B frames) of a predetermined number.

Therefore, in the case of editing the moving image data coded by the MPEG method, a dividing or combining process is executed on a GOP unit basis.

In recent years, a moving image of a high frame rate (the number of frames per unit time) is handled. For example, among consumer-use video cameras, a video camera which can photograph a moving image of 60 frames/second (fps) has been proposed. In the case where a time code is added to the moving image of such a high frame rate, the time code of the same value is added to a plurality of frames.

In the case where the time code of the same value is added to a plurality of frames in an overlap manner as mentioned above, if an editing is performed by using the time code in a manner similar to that in the related art, there is such a problem that the moving image subjected to the editing is missing a frame or the moving image data is not combined at a desired position of the user.

SUMMARY OF THE INVENTION

In consideration of the foregoing problems, it is an aspect of the invention to provide an image processing apparatus and an image processing method which enable moving image data to be desirably edited in the case of editing the moving image data in which a time code of a same value is added to a plurality of frames.

To accomplish the aspect of the invention, an image processing apparatus for editing moving image data of a plurality of successive frames to which a time code of a same value is made to correspond every first predetermined number of frames among the plurality of frames, the moving image data being coded on a unit basis of a coding unit which includes a second predetermined number of frames by a predetermined coding method, obtains information regarding the coding unit from management information of the moving image data, determines a candidate of an editing point of the moving image data on the basis of the obtained information regarding the coding unit and the time code which is made to correspond to the plurality of frames of the moving image data, sets the editing point of the moving image data on the basis of the editing point designated by a user and the determined candidate, and edits the moving image data in accordance with the set editing point.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail with reference to the drawings.

Figure 1:
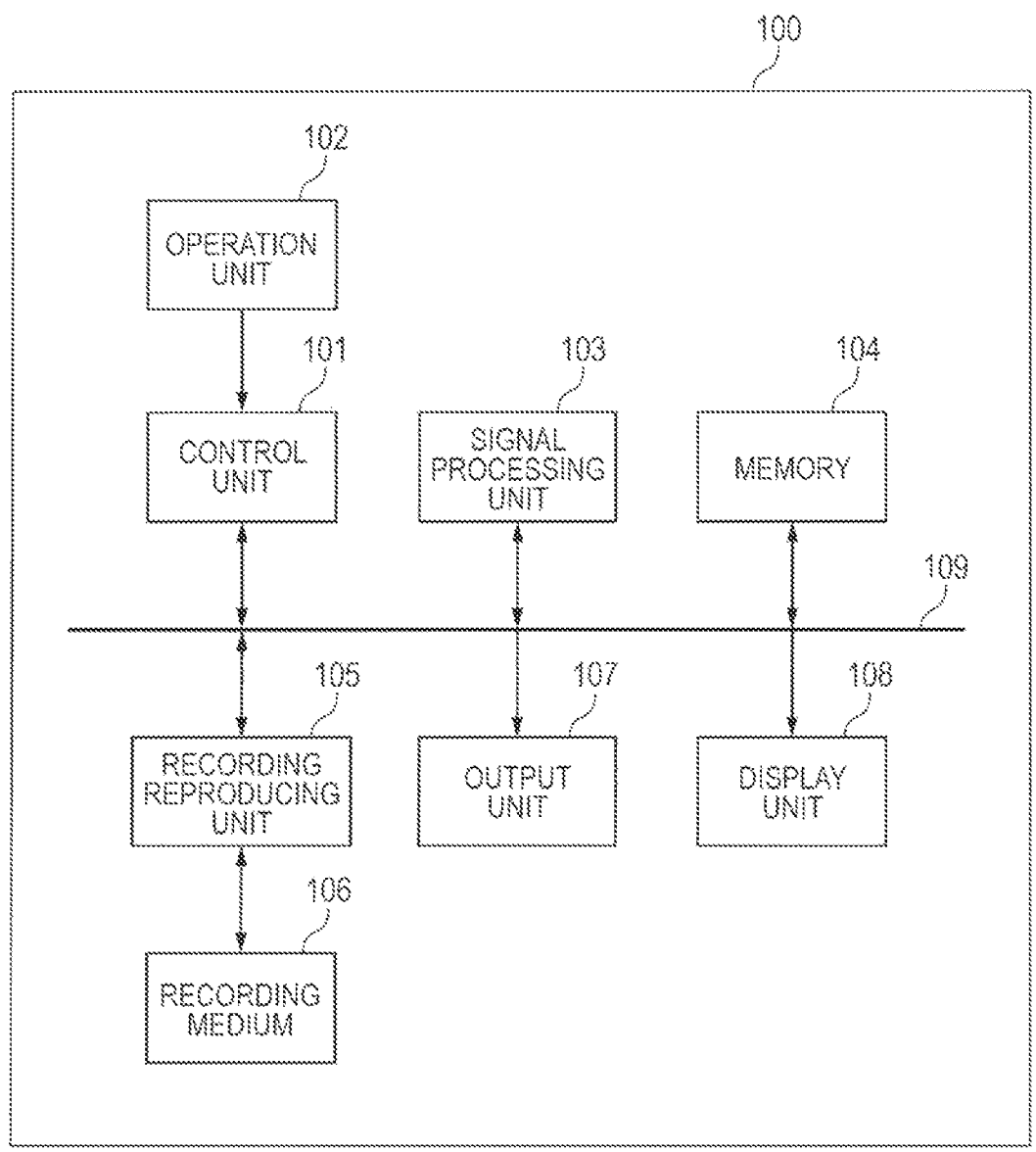
FIG. 1 is a block diagram illustrating a construction of an image processing apparatus according to an embodiment of the invention.

FIG. 1 is a block diagram illustrating an example of a construction of an image processing apparatus 100 according to an embodiment.

In FIG. 1, a control unit 101 controls the whole operation of the image processing apparatus 100 in accordance with an input from an operation unit 102. The control unit 101 includes a microcomputer, a memory, and the like and controls the image processing apparatus 100 in accordance with a program stored in the memory. The control unit 101 also has a built-in recording medium interface (IF) for communicating data and commands with a recording reproducing unit 105. The operation unit 102 includes various kinds of switches which can be operated by the user. The operation unit 102 receives various kinds of instructions and the like from the user and notifies the control unit 101 of them. The operation unit 102 includes a power switch, switches for outputting various kinds of instructions necessary for an editing process, and the like.

A signal processing unit 103 decodes moving image data and audio data reproduced from a recording medium 106 and expands an information amount. A memory 104 stores the moving image data and audio data. Each block of the image processing apparatus 100 processes the necessary moving image data and audio data by accessing the memory 104. Besides the moving image data and audio data, the memory 104 stores various kinds of information such as information of a file system, management information, and the like. Further, the memory 104 also plays a role of a work memory or the like for control by the control unit 101.

The recording reproducing unit 105 reproduces the moving image data and audio data recorded in the recording medium 106 and stores into the memory 104. In accordance with an editing instruction, the recording reproducing unit 105 processes the moving image data recorded in the recording medium 106. In the present embodiment, the recording medium 106 is a random access recording medium such as hard disk (HDD), flash memory card, or the like. The recording reproducing unit 105 manages the moving image data and audio data recorded in the recording medium 106 and various kinds of information as a file in accordance with a file system such as FAT (File Allocation Table) or the like.

The recording reproducing unit 105 has a well-known interface (IF) such as ATA or the like and communicates data and various kinds of commands with a recording medium IF in the control unit 101. The recording medium 106 is constructed in such a manner that it can be easily loaded and unloaded into/from the image processing apparatus 100 by a recording medium loading and unloading mechanism (not shown). However, the recording medium 106 may be built in the image processing apparatus 100.

The control unit 101 controls the recording reproducing unit 105, reproduces file system data (management data) from the recording medium 106, and stores into the memory 104. The file system data is data showing a file name and a file size of the data recorded in the recording medium 106, a recording address of the data, and the like and thus is management information to manage files. The control unit 101 controls the writing and reading of a file in accordance with the read-out file system data. In response to a writing instruction or an editing instruction of a file into the recording medium 106, the control unit 101 updates the file system data stored in the memory 104. The control unit 101 records the updated file system data into the recording medium 106 by the recording reproducing unit 105.

An output unit 107 outputs the reproduced moving image data and audio data to an external display apparatus or the like of the image processing apparatus 100. A display unit 108 displays a moving image and various kinds of information to the display apparatus such as a liquid crystal panel or the like. A data bus 109 is used to transmit and receive data and various kinds of control commands among the respective units of the image processing apparatus 100.

Subsequently, a moving image file which is handled by the image processing apparatus according to the present embodiment will be described. The image processing apparatus according to the present embodiment processes the moving image file of an MOV file format.

Figure 2:
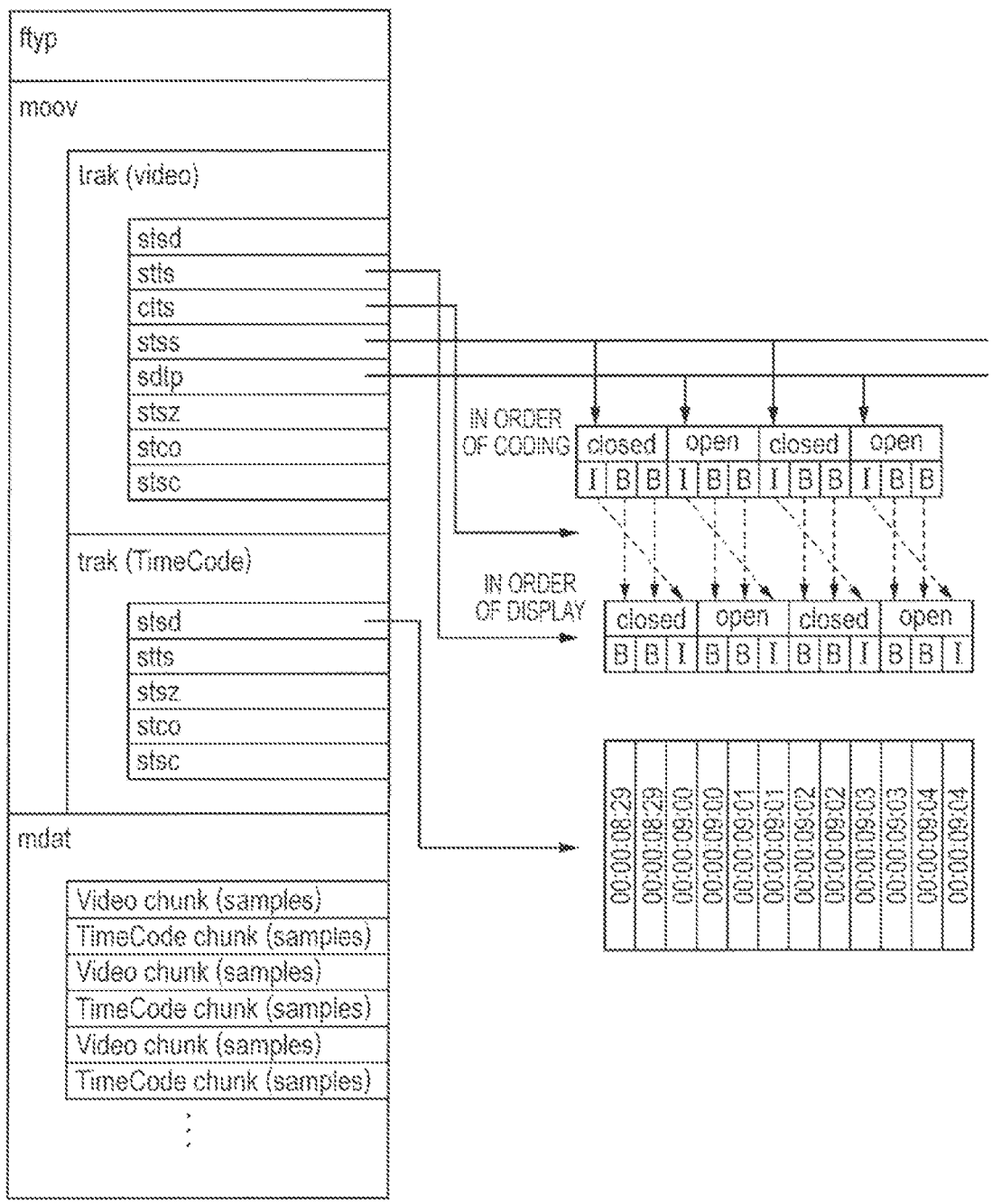
FIG. 2 is a diagram illustrating a construction of an MOV file.

FIG. 2 is a diagram illustrating a construction of the moving image file of the MOV file format recorded in the recording medium 106. The MOV file is constructed by a unit called atom (atom). In FIG. 2, compatibility identification information of the file is stored into "ftyp". Management information to access the moving image data and time code is stored into "moov". A substance of the moving image data and time code is stored into "mdat". In the MOV format, a plurality of tracks (trak) can be stored into one file. In the atom stored in "moov", the management information of the moving image data and time code of the corresponding track is stored into "trak".

Information to discriminate which one of the moving image data and time code is a management object is stored into "stsd". Information showing each frame in the moving image and a frequency (frame rate) of the time code is stored into "stts".

In the MPEG method, displaying order and coding order of a plurality of successive frames of the moving image differ from each other. Therefore, information to rearrange the coding order and the displaying order of each frame in the moving image is stored into "ctts".

In the MPEG method, in order to decode a frame whose coding type is the P or B frame, it is necessary to decode a frame which is of a coding type of the I frame serving as a reference frame. Therefore, in the case of performing a random access, it is necessary to start the decoding from the I frame of a closed GOP. In MPEG, there are a closed GOP and an open GOP as types of GOP which is a coding unit. The closed GOP is a GOP which does not include a frame which refers to the GOPs before and after the present GOP. Information to discriminate the random-accessible frame in such moving image data is stored into "stss".

Information to discriminate whether or not each frame of the moving image data is a non-reference frame is stored into "sdtp". Information to access each moving image frame or time code is stored into "stsz", "stco", and "stsc", respectively.

In "mdat", "Video chunk" indicates a plurality of collected frames in the moving image data. "Video Sample" indicates real data of one frame in the moving image data. "Time Code chunk" indicates a plurality of collected time code data. "Time Code Sample" indicates real data of one time code data.

First Embodiment

Figure 3:
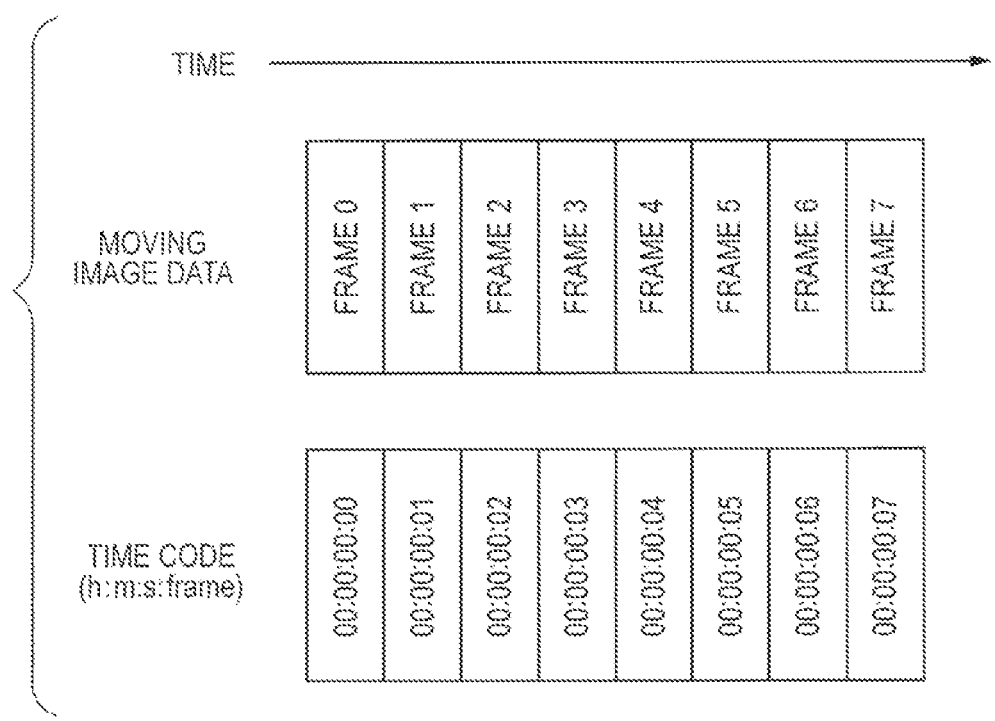
FIG. 3 is a diagram illustrating an allocation of frames and time codes.

Subsequently, the editing operation of the moving image data according to the first embodiment of the invention will be described. It is assumed here that each moving image data recorded in the recording medium 106 is a moving image of 60 fps and a time code of the NTSC method is added to the moving image data. Therefore, a value of the time code which is added to each frame of the moving image data is as illustrated in FIG. 3.

Figure 4:
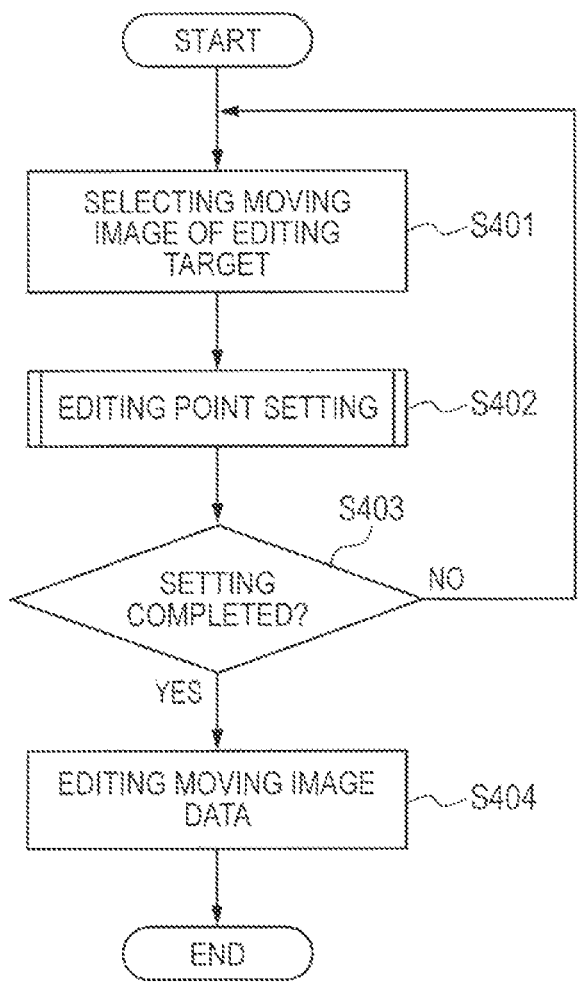
FIG. 4 is a flowchart for the editing operation in the image processing apparatus according to the first embodiment of the invention.

FIG. 4 is a flowchart for the editing operation of the moving image data according to the first embodiment of the invention. The operation illustrated in FIG. 4 is executed under control of the control unit 101. In the embodiment, as an example, such a process that an In-point and an Out-point (editing point) of the moving image are designated by the user and the moving image data is combined at the designated In-point and Out-point and recorded as new moving image data into the recording medium 106 will be described as an editing process. Besides such a process, a process for dividing the moving image data into two portions at the editing point or the like can be also executed. Those processes can be executed by a method whereby the user operates the operation unit 102 and instructs the control unit 101 to execute the process.

When an editing start instruction is provided by the user, the control unit 101 displays each moving image file recorded in the recording medium 106 onto the display unit 108 on the basis of the management information of the file system. The user selects a moving image of an editing object from the displayed moving image file (S401). When the moving image of the editing object is selected, the control unit 101 advances to a process for setting an editing point in this moving image (S402). The setting operation of the editing point will be described hereinafter. When the setting of the editing point is completed, the control unit 101 discriminates whether or not the execution of the editing process is instructed by the user (S403). In the case of continuing the editing, the processing routine is returned to S401. When the execution of the editing process is instructed, the control unit 101 instructs the recording reproducing unit 105 to combine the moving image data at the set editing point, generate a new moving image file, and record into the recording medium 106 (S404). The recording reproducing unit 105 generates new moving image data in which the designated moving image data are combined at the designated editing point. For example, moving image data in a range from a head of a certain moving image to the Out-point is extracted and combined with the portion in a range from the In-point to the end of another moving image. The recording reproducing unit 105 obtains the time code corresponding to the new moving image data from the original moving image file. The recording reproducing unit 105 forms management information (moov) regarding the moving image data obtained by the combination and the time code and records into the recording medium 106 as a moving image file of the MOV file format.

Figure 6:
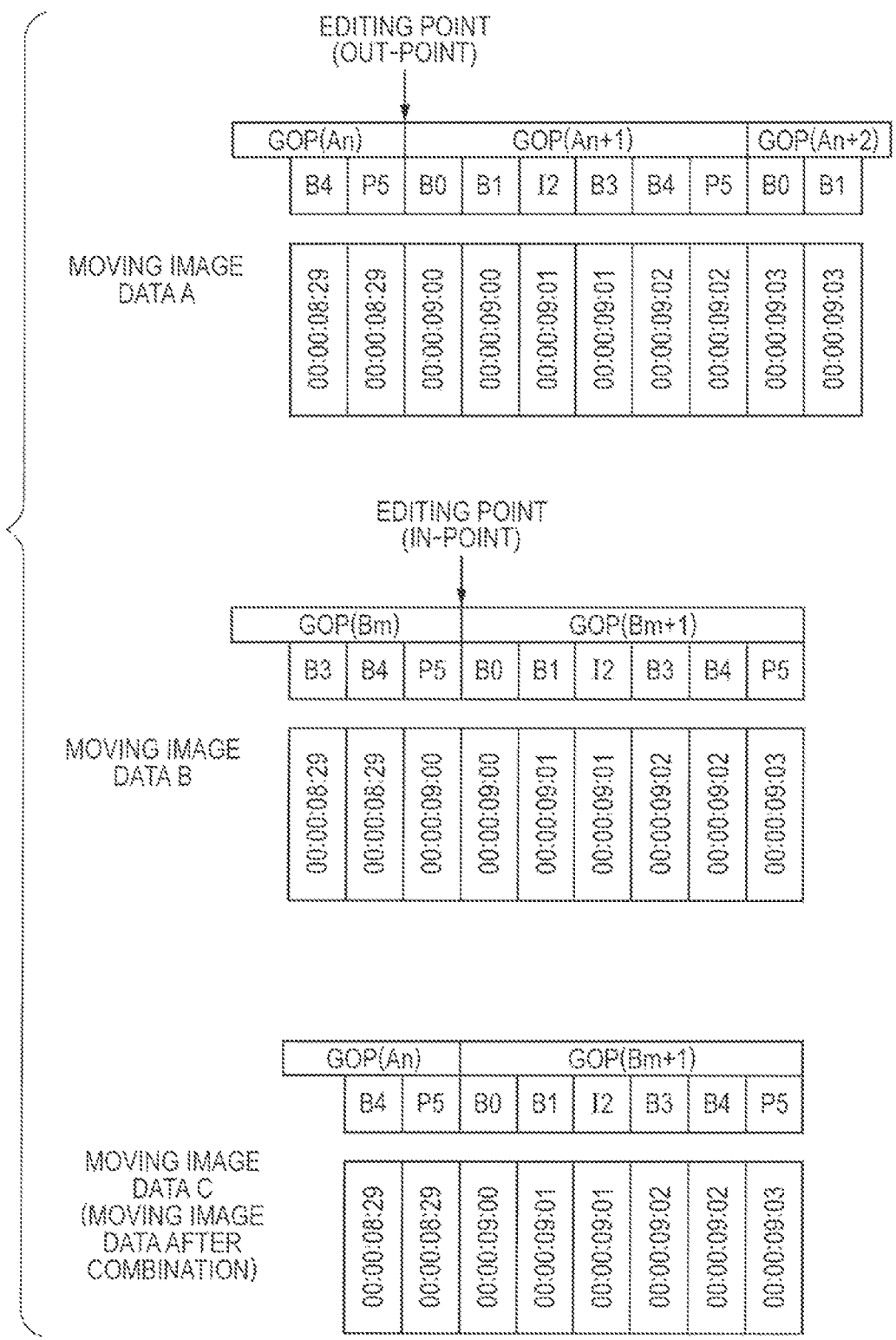
FIG. 6 is a diagram illustrating a construction of moving image data at the time of combining two moving image data.

Subsequently, problems occurring in the setting process of the editing point will be described. FIG. 6 illustrates a construction of the moving image data when the user combines moving image data A and B by setting, for example, a time code value (00:00:09:00) as an editing point. In FIG. 6, B4, P5, I2, and the like indicate B, P, and I frames, respectively. In the diagram, it is assumed that the same time code is allocated to the moving image data every two successive frames.

In moving image data A, the data in which a time code value is equal to (00:00:08:29) and which is the data up to a frame P5 also serving as a GOP boundary becomes valid data. In moving image data B, the data after the frame corresponding to the time code value (00:00:09:00) becomes valid data. Therefore, the data after a head frame B0 of GOP(m+1) which has a time code value of (00:00:09:00) and also is a GOP boundary becomes valid data.

Moving image data C is generated by combining the data up to a GOP(An) of the moving image data A and the data after a GOP(m+1) of the moving image data B. However, in the moving image data C, it is missing a P5 frame corresponding to the time code value (00:00:09:00) in the moving image data B. Therefore, in the moving image data C, there is such a problem that only one frame corresponding to the time code value (00:00:09:00) is displayed.

In the present embodiment, therefore, the control unit 101 determines a frame (position) which can be set as an editing point on the basis of information of a start frame of the GOP in the displaying order or coding order of the moving image data and a change point of the time code, so that such a problem as mentioned above does not occur.

Figure 5:
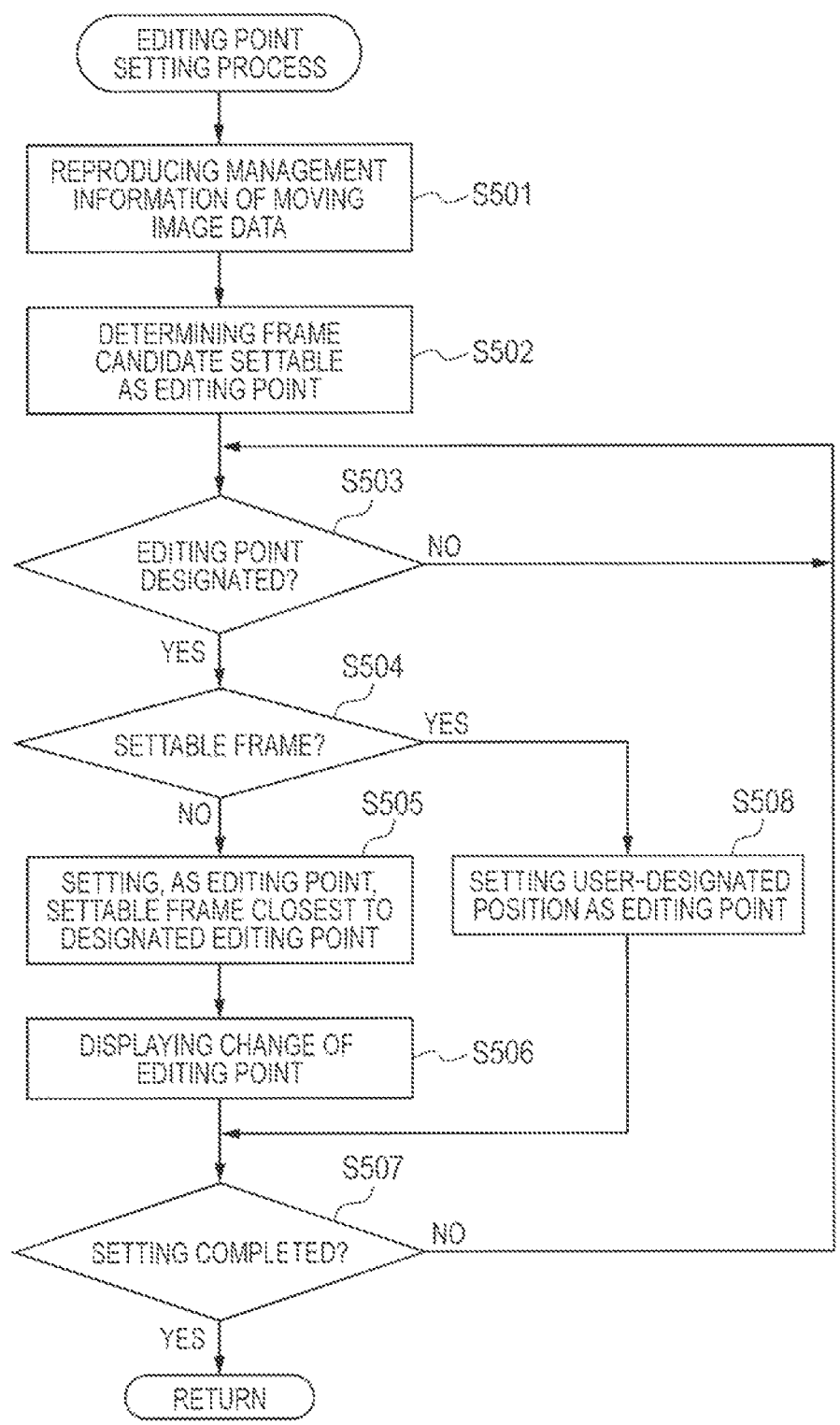
FIG. 5 is a flowchart for the setting operation of an editing point in the image processing apparatus according to the first embodiment of the invention.

FIG. 5 is a flowchart for the setting operation of the editing point in the image processing apparatus according to the present embodiment. The control unit 101 instructs the recording reproducing unit 105 to reproduce the management information (moov) of the moving image file (MOV file) of the designated editing object (S501). The recording reproducing unit 105 reads out the management information of the designated moving image file and stores into the memory 104. Subsequently, the control unit 101 determines a frame (position) which can be set as an editing point in the moving image data of the editing object on the basis of the management information stored in the memory.

First, the control unit 101 obtains a frame rate of the moving image data and a frequency of the time code data by referring to "stts" in "trak" in the management information (moov) stored in the memory 104. Subsequently, the control unit 101 detects the number of frames to which the same time code is added and detects the position of the frame serving as a change point of the time code value.

Subsequently, the control unit 101 obtains the frame number of the coding order of an I frame positioning at the head of the GOP from "stss" and "sdtp" in video "trak". Further, the control unit 101 discriminates whether or not the GOP is the open GOP or the closed GOP. The frame shown by "stss" corresponds to the I frame of the closed GOP. The frame which is not shown in "stss" and is designated as an I frame in "sdtp" corresponds to the I frame of the open GOP.

Subsequently, by using "ctts" showing a rearrangement of the displaying order and the coding order and the frame number of the I frame obtained as mentioned above, the control unit 101 obtains the frame number of the head frame in the displaying order of each GOP and the frame number in the displaying order of the I frame of the closed GOP.

Information regarding the GOP which is a coding unit, obtained by the foregoing processes is as follows.

1. Frame number of the I frame of each GOP in the displaying order from the head of the moving image.
2. Frame number of the head frame of each GOP in the displaying order from the head of the moving image.
3. Each GOP is either the open GOP or the closed GOP.

On the basis of those information, the control unit 101 determines a frame (position) which can be set as an editing point in the moving image data of the editing target as a candidate of the editing point.

First, with respect to the In-point, it is assumed that a frame from which decoding can be started and which is at a position where the time code value changes is a frame which can be set as an In-point. Therefore, as a frame which can be set as an In-point, the control unit 101 determines the I frame of each GOP or a frame which is a head frame in the displaying order of the closed GOP and at which the time code value is changed. When such a settable frame is set as an editing point, the data of the frames after the editing point becomes the valid data of the moving image data.

Figure 7A:
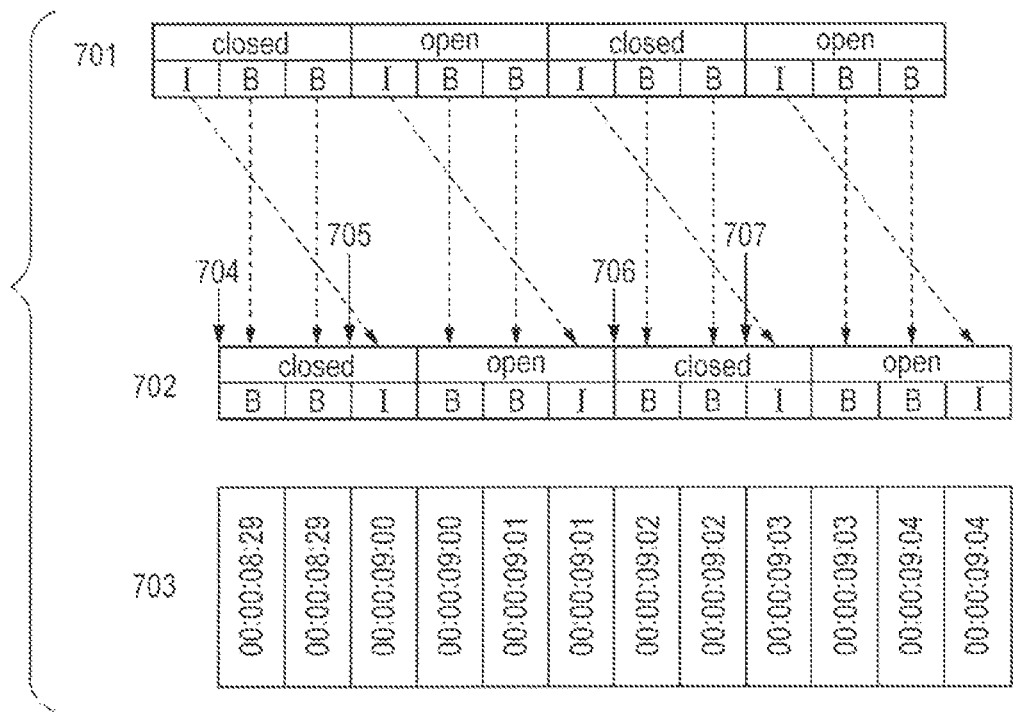
FIGS. 7A and 7B are diagrams illustrating an editing point (In-point) determined in accordance with the first embodiment of the invention.
Figure 7B:
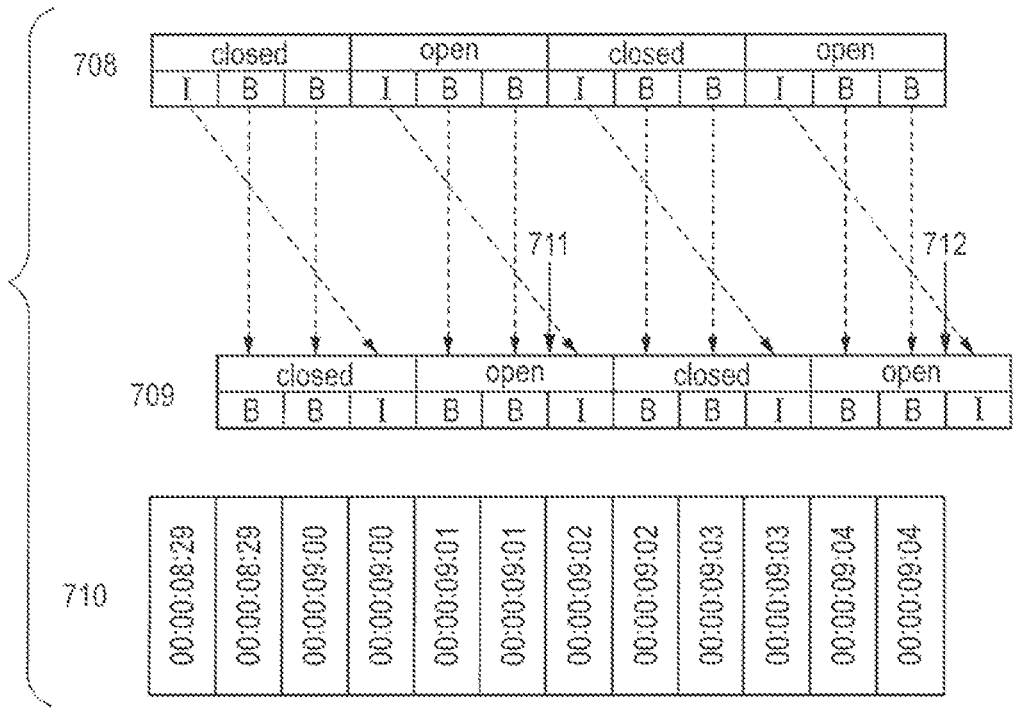

FIGS. 7A and 7B illustrate the position (candidate of the editing point) of the frame which can be set as an In-point. In FIGS. 7A and 7B, each frame and a GOP of the moving image data of the coding order are shown in 701 and 708, respectively. Each frame and a GOP of the moving image data of the displaying order are shown in 702 and 709, respectively. In FIGS. 7A and 7B, a construction including the second predetermined number of the frames of which include only the I frames and B frames as moving image data is illustrated as an example. However, naturally, a construction including the P frames may be used. In FIGS. 7A and 7B, time codes 703 and 710 each of which is added to each frame are illustrated. Also in the present moving image data, it is assumed that the same time code is allocated every two successive frames.

With respect to the closed GOP, as illustrated in FIG. 7A, frames 704 and 706 each of which is a head frame of the displaying order and is a change point of the time code value are determined as candidates of the time code value. Further, frames 705 and 707 each of which is an I frame of the GOP and is a change point of the time code value are determined as candidates of the In-point.

With respect to the open GOP, as illustrated in FIG. 7B, frames 711 and 712 each of which is an I frame of the GOP and is a change point of the time code value are determined as candidates of the In-point.

Subsequently, with respect to the Out-point, it is assumed that a position which is a display end position of the last frame of the displaying order of the GOP and which is a time code value position is an editing point which can be set as an Out-point (the time code of the last frame is not changed). Therefore, the control unit 101 determines a frame which is a head frame of the displaying order of the GOP subsequent to the above-mentioned GOP and is a frame in which the time code value is changed, as a frame which can be set as an Out-point. When such a settable frame is set as an editing point, the data of the frames up to the editing point becomes the valid data of the moving image data.

Figure 8A:
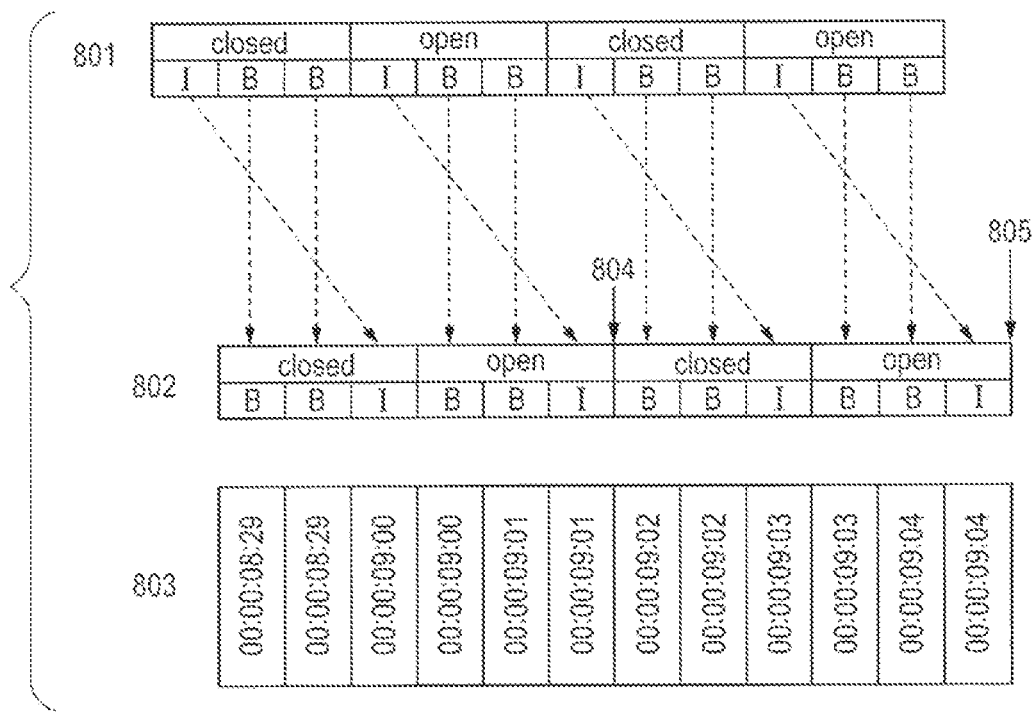
FIGS. 8A and 8B are diagrams illustrating an editing point (Out-point) determined in accordance with the first embodiment of the invention.
Figure 8B:
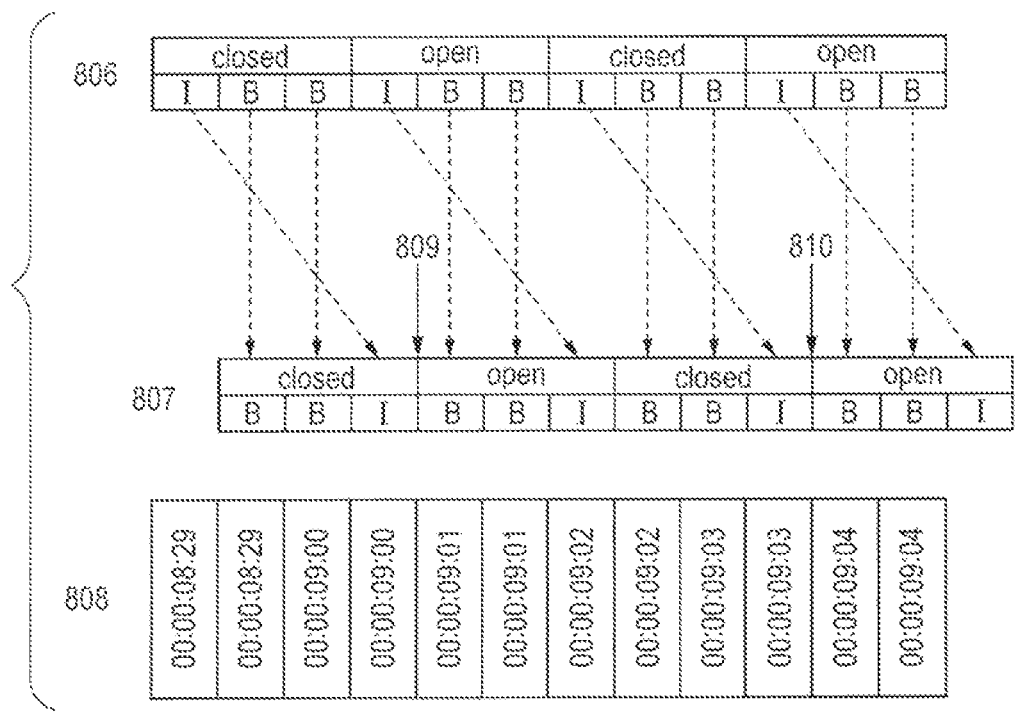

FIGS. 8A and 8B illustrate the position of the frame which can be set as an Out-point. In FIGS. 8A and 8B, each frame and a GOP of the moving image data of the coding order are shown in 801 and 806, respectively. Each frame and a GOP of the moving image data of the displaying order are shown in 802 and 807, respectively. In FIGS. 8A and 8B, a construction including only the I and B frames as moving image data is illustrated as an example. However, naturally, a construction including the P frames may be used. In FIGS. 8A and 8B, time codes 803 and 808 each of which is added to each frame are illustrated. As mentioned above, the same time code is allocated every two continuous frames.

As illustrated in FIGS. 8A and 8B, in any of the open GOP and the closed GOP, frames 804, 805, 809, and 810 each of which is a head frame of the displaying order and is a change point of the time code value are determined as candidates of the Out-point.

Returning to FIG. 5, after the frames which can be set as an In-point and an Out-point are determined as mentioned above, the control unit 101 discriminates whether or not the editing point (In-point, Out-point) is designated by the user through the operation unit 102 (S503). If the editing point is designated by the user, the control unit 101 discriminates whether or not the designated editing point (frame position) is a frame which can be set as an In-point or Out-point decided as a candidate in S502 (S504).

If the position designated by the user is the frame which can be set as an editing point, as an editing point, the control unit 101 sets the frame designated by the user (S508). If the position designated by the user is not the frame which can be set as an editing point, as an editing point, the control unit 101 sets a candidate of the frame which is closest to the position designated by the user (S505). The control unit 101 displays information indicating that the editing point is changed, on the display unit 108 (S506), and discriminates whether or not the setting of the editing point is finished (S507). If the setting of the editing point is finished, the control unit 101 finishes the editing point setting process and returns to the process of FIG. 4.

As mentioned above, in the present embodiment, when the moving image coded by the MPEG method is edited, the head frame of the GOP in the displaying order or the I frame of the GOP can be set as an editing point. Therefore, in the case where the moving image data is combined or divided using the coded data, the decoding of the moving image data can be also correctly started from the editing point.

Further, in the present embodiment, the head frame of the GOP in the displaying order or the I frame of the GOP at which time code value changes can be set as an editing point. Therefore, in the case where the same time code value is allocated to a plurality of frames, it can be prevented that such an inconvenience that the frame is missing the time code occurs after the editing.

Although the present embodiment has been described with respect to the process of the moving image data coded by the MPEG method, the invention can be also similarly applied to another case where the moving image data in which the same time code value is allocated to a plurality of frames is processed.

The present embodiment has been described with respect to the case where the same time code value is allocated every two frames. The invention can be also similarly applied to another case where the moving image data in which the same time code value is allocated every plural frames such as three frames or more is processed.

Although the present embodiment has been described with respect to the case where the moving image data recorded by the MOV file format is processed, the invention can be also similarly applied to another case of processing moving image data of another format.

According to the invention mentioned above, in the case of editing the moving image data in which the time code of the same value is added to a plurality of frames, the moving image data can be desirably edited.

Modification of the First Embodiment

In the first embodiment, the candidate of the editing point is previously determined for the selected moving image and, thereafter, a setting possibility of the editing point which is designated by the user is discriminated on the basis of the decided candidate. On the other hand, it may be also implemented to construct in such a manner that in accordance with the user designating the editing point, a candidate of the editing point is determined to the GOP in a predetermined range including the editing point in a manner similar to the first embodiment, and thereafter, a setting possibility is discriminated or the candidate is presented, so that the user selects or changes it. In such a case, it may be also implemented to construct in such a manner that whether or not the editing point designated by the user can be set is discriminated on the basis of the decided candidate and a result of the discrimination is presented to the user by a display method such as a mark or the like.

Other Embodiment

Each unit constructing the recording apparatus in the embodiments of the invention mentioned above and each processing step of the recording method can be realized by a method whereby the program stored in the RAM, ROM, or the like of the computer operates. The program and a computer-readable storage medium in which the program is stored are incorporated in the invention.

The invention can be also embodied as, for example, a system, an apparatus, a method, a program, a storage medium, or the like. Specifically speaking, the invention can be also applied to a system constructed by a plurality of apparatuses or to an apparatus constructed by one equipment.

The invention incorporates a case where a program of software for realizing the functions of the embodiments as mentioned above (program corresponding to the flowcharts illustrated in FIGS. 4 and 5 in the embodiments) is directly supplied to a system or apparatus or is supplied from a remote place. The invention also incorporates a case where a computer of the system or apparatus reads out and executes a program code of the supplied program.

Therefore, the program code itself which is installed into the computer in order to realize the functions and processes of the invention by the computer also realizes the invention. That is, a computer program itself for realizing the functions and processes of the invention is also incorporated in the invention.

In this case, any form such as object code, program which is executed by an interpreter, script data which is supplied to the OS, or the like may be used so long as it has the functions of the program.

As a storage medium for supplying the program, for example, there is a flexible disk, a hard disk, an optical disk, a magnetooptic disk, or the like. Further, there is an MO, a CD-ROM, a CD-R, a CD-RW, a magnetic tape, a nonvolatile memory card, a ROM, a DVD (DVD-ROM, DVD-R), or the like.

As another program supplying method, there is a method whereby a computer is connected to Homepage of the Internet by using a browser of a client computer. The program can be also supplied by supplying the computer program itself of the invention from Homepage or by downloading a compressed file including an automatic installing function into a storage medium such as a hard disk or the like.

The program supplying method can be also realized by a method whereby the program code constructing the program of the invention is divided into a plurality of files and each file is downloaded from different Homepage. That is, a WWW server for allowing a plurality of users to download a program file for realizing the functions and processes of the invention by the computer is also incorporated in the invention.

As another method, the program supplying method can be also realized by a method whereby the program of the invention is encrypted, stored into the storage medium such as a CD-ROM or the like, and distributed to the users, the users who cleared predetermined conditions are allowed to download key information for decrypting the encryption from Homepage through the Internet, and by using the key information, the encrypted program is executed and installed into the computer.

The functions of the embodiments mentioned above are realized by a method whereby the computer executes the read-out program. Further, the functions of the embodiments mentioned above are also realized by a method whereby the OS or the like which operates on the computer executes a part or all of actual processes on the basis of instructions of the program, and those functions are realized by those processes.

Further, as another method, the functions of the embodiments mentioned above are also realized by a method whereby the program which was read out of the storage medium is written into a memory provided for a function expanding board inserted in a computer or a function expanding unit connected to the computer, a CPU or the like provided for the function expanding board or function expanding unit executes a part or all of actual processes on the basis of instructions of the program, and those functions are realized by those processes.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-247455 filed on Nov. 9, 2012, which is hereby incorporated by reference herein in its entirety.

What is claimed is:

1. An image processing apparatus comprising:
a processor;
an obtaining unit configured to obtain moving image data coded by a predetermined coding method using a plurality of coding types on a unit basis of a coding unit which includes a first predetermined number of frames, where a time code having a same value corresponds to every second predetermined number of frames of the moving image data;
a determining unit configured to determine, in accordance with information regarding the coding unit of the moving image data and the time codes corresponding to a plurality of frames of the moving image data, as a candidate frame of an editing point of the moving image data, a frame which is of a predetermined coding type and corresponds to a time code having a value different from that of a time code of an immediately-precedent frame;
a setting unit configured to set a frame of the editing point of the moving image data in accordance with the candidate frame determined by the determining unit;
an editing unit configured to edit the moving image data in accordance with the frame of the editing point set by the setting unit; and
a memory including instructions that cause the processor to function as one of the obtaining unit, the determining unit, the setting unit and the editing unit.

2. The apparatus according to claim 1, wherein:
the information regarding the coding unit includes information regarding the coding type and a position of each frame included in the coding unit; and
the determining unit determines the candidate frame in accordance with the position of the frame of the predetermined coding type in the plurality of coding units and the time code of the frame of the predetermined coding type.

3. The apparatus according to claim 2, wherein:
the information regarding the coding unit includes information for discriminating whether or not the coding unit is of either a first type in which the frame coded by referring to a frame of another coding unit is not included or a second type in which the frame coded by referring to the frame of another coding unit is included; and
the determining unit determines the candidate frame in accordance with the position of the frame of the predetermined coding type in the plurality of coding units, a result of the discriminating whether or not the coding unit is of either the first type or the second type, and the time code of the frame of the predetermined coding type.

4. The apparatus according to claim 3, wherein the plurality of coding types include an intra-frame coding type and an inter-frame coding type, and
wherein if the coding unit is of the first type, the determining unit determines, as the candidate frame, the frame which is of the inter-frame coding type in which displaying order in the coding unit is the first and corresponds to a time code having a value different from that of a time code of an immediately-precedent frame.

5. The apparatus according to claim 3, wherein the plurality of coding types include an intra-frame coding type and an inter-frame coding type, and
wherein if the coding unit is of the second type, the determining unit determines, as the candidate frame, the frame which is of the intra-frame coding type and corresponds to a time code having a value different from that of a time code of an immediately-precedent frame.

6. The apparatus according to claim 1, wherein an editing process which is executed by the editing unit includes a dividing process for dividing the moving image data at the editing point and a combining process for combining the moving image data and other moving image data at the editing point.

7. An image processing apparatus comprising:
a processor;
an obtaining unit configured to obtain moving image data coded by a predetermined coding method using a plurality of coding types on a unit basis of a coding unit which includes a first predetermined number of frames, where a time code having a same value corresponds to every second predetermined number of frames of the moving image data;

a determining unit configured to determine, in accordance with information regarding positions of a plurality of frames in the moving image data, as a candidate frame of an editing point of the moving image data, a frame which is of a predetermined coding type and corresponds to a time code having a value different from that of a time code of an immediately-precedent frame;

a setting unit configured to set a frame of the editing point of the moving image data in accordance with the candidate frame determined by the determining unit;

an editing unit configured to edit the moving image data in accordance with the frame of the editing point set by the setting unit; and a memory including instructions that cause the processor to function as one of the obtaining unit, the determining unit, the setting unit and the editing unit.

8. The apparatus according to claim 7, wherein the plurality of coding types include an intra-frame coding type and an inter-frame coding type, and wherein the setting unit sets, as the frame of the editing point, the frame which is of the intra-frame coding type and corresponds to a time code having a value different from that of a time code of an immediately-precedent frame.

9. The apparatus according to claim 7, wherein the plurality of coding types include an intra-frame coding type and an inter-frame coding type, wherein the setting unit sets, as the frame of the editing point, the frame which is of the inter-frame coding type, has a displaying order being first in the coding unit, and corresponds to a time code having a value different from that of a time code of an immediately-precedent frame.

10. The apparatus according to claim 9, wherein the coding unit is one of a first type in which the frame coded by referring to a frame of another coding unit is not included and a second type in which the frame coded by referring to the frame of another coding unit is included, and wherein the setting unit sets, as the frame of the editing point, a frame which is of the inter-frame coding type, has a displaying order being first in the coding unit of the first type, and corresponds to a time code having a value different from that of a time code of an immediately-precedent frame.

11. The apparatus according to claim 7, wherein the setting unit sets the frame of the editing point of the moving image data if an instruction for designating an editing point by a user is received.

12. The apparatus according to claim 7, wherein an editing process which is executed by the editing unit includes a dividing process for dividing the moving image data at the editing point and a combining process for combining the moving image data and other moving image data at the editing point.

13. A non-transitory computer-readable storage medium storing a program that causes a computer to function as each unit of an apparatus according to claim 7.

14. An image processing apparatus comprising:
a processor;
an obtaining unit configured to obtain moving image data coded by a predetermined coding method using a plurality of coding types including an intra-frame coding type and an inter-frame coding type on a unit basis of a coding unit which includes a first predetermined number of frames, where a time code having a same value corresponds to every second predetermined number of frames of the moving image data;

a determining unit configured to determine a candidate frame of an editing point of the moving image data,
wherein the editing point includes an In-point and an Out-point, and
wherein the determining unit determines, as a candidate frame of the In-point, a frame which is of the inter-frame coding type, has a displaying order being first in the coding unit, and corresponds to a time code having a value different from that of a time code of an immediately-precedent frame and determines, as a candidate frame of the Out-point, a frame which has a displaying order being last in the coding unit, and corresponds to a time code having a value different from that of a time code of a next frame;

a setting unit configured to set a frame of the editing point of the moving image data in accordance with the candidate frame determined by the determining unit;

an editing unit configured to edit the moving image data in accordance with the frame of the editing point set by the setting unit; and a memory including instructions that cause the processor to function as one of the obtaining unit, the determining unit, the setting unit and the editing unit.

15. The apparatus according to claim 14, wherein the setting unit sets the frame of the editing point of the moving image data if an instruction for designating an editing point by a user is received.

16. The apparatus according to claim 14, wherein an editing process which is executed by the editing unit includes a dividing process for dividing the moving image data at the editing point and a combining process for combining the moving image data and other moving image data at the editing point.

17. An image processing method comprising:
obtaining moving image data coded by a predetermined coding method using a plurality of coding types on a unit basis of a coding unit which includes a first predetermined number of frames, where a time code having a same value corresponds to every second predetermined number of frames of the moving image data;

determining, in accordance with information regarding positions of a plurality of frames in the moving image data, as a candidate frame of an editing point of the moving image data, a frame which is of a predetermined coding type and corresponds to a time code having a value different from that of a time code of an immediately-precedent frame;

setting a frame of the editing point of the moving image data in accordance with the candidate frame determined in the determining; and editing the moving image data in accordance with the frame of the editing point set in the setting.

18. The method according to claim 17, wherein the plurality of coding types include an intra-frame coding type and an inter-frame coding type, and wherein the setting sets, as the frame of the editing point, the frame which is of the intra-frame coding type and corresponds to a time code having a value different from that of a time code of an immediately-precedent frame.

19. The method according to claim 17, wherein the plurality of coding types include an intra-frame coding type and an inter-frame coding type, and wherein the setting sets, as the frame of the editing point, the frame which is of the inter-frame coding type, has a displaying order being first in the coding unit, and corresponds to a time code having a value different from that of a time code of an immediately-precedent frame.

20. The method according to claim 19, wherein the coding unit is one of a first type in which the frame coded by referring to a frame of another coding unit is not included and a second type in which the frame coded by referring to the frame of another coding unit is included, and wherein the setting sets, as the frame of the editing point, a frame which is of the inter-frame coding type, has a displaying order being first in the coding unit of the first type, and corresponds to a time code having a value different from that of a time code of an immediately-precedent frame.

21. The method according to claim 17, wherein the setting sets the frame of the editing point of the moving image data if an instruction for designating an editing point by a user is received.

* * * * *